United States Patent [19]

Gweon et al.

[11] Patent Number: 5,774,210
[45] Date of Patent: Jun. 30, 1998

[54] PERPENDICULARITY MEASURING METHOD AND AN APPARATUS THEREOF

[75] Inventors: Dae-Gab Gweon, Yusung-Gu; Young-Bin Cho, Seo-Gu; Hee Hyeong Moon, Yusung-Gu, all of Rep. of Korea

[73] Assignee: Sam Jung Co., Ltd., Rep. of Korea

[21] Appl. No.: 634,463

[22] Filed: Apr. 18, 1996

[30] Foreign Application Priority Data

Apr. 10, 1995 [KR] Rep. of Korea ............... 95-24626
Apr. 18, 1995 [KR] Rep. of Korea ............... 95-9015

[51] Int. Cl.$^6$ ............................................. G01C 1/06
[52] U.S. Cl. ............................... 356/139.1; 356/153
[58] Field of Search ......................... 356/139.1, 139.03, 356/153, 138

[56] References Cited

U.S. PATENT DOCUMENTS

| | | | |
|---|---|---|---|
| 4,298,281 | 11/1981 | Schave | 356/138 |
| 4,968,147 | 11/1990 | Shoemaker | 356/399 |
| 5,379,112 | 1/1995 | Ollivier et al. | 356/150 |
| 5,532,815 | 7/1996 | Kipman et al. | 356/139.03 |

*Primary Examiner*—Mark Hellner
*Attorney, Agent, or Firm*—Michaelson & Wallace; Peter L. Michaelson; John C. Pokotylo

[57] ABSTRACT

A non-contacting type method for measuring perpendicularity of a straight post installed perpendicularly to a reference plane is performed by picking up partial images of an upper end and a lower end of the post in two directions vertical to each other to combine obtained images into one image, calculating inclinations or deviations of four images of lower end portion and upper end portion in the combined image, and comparing the inclinations or deviations to measure the perpendicularity with respect to the reference plane. An apparatus thereof includes a measuring section for optically obtaining image data of the object to be measured, a measuring-part driving unit for driving the measuring part in the X, Y and Z directions which are perpendicular to one another, and a data processing part for processing and calculate the image data obtained by the measuring part to display the result of perpendicularity calculation. Thus, by adopting an optical principle without actually contacting the measured object, a problem of causing an error due to the direct contact is solved while being applied to the measurement of an object with a small measuring space. Because a measuring section is freely moved with respect to the X, Y and Z directions to execute the measurement, even a different object requires no separate setting to thus facilitate the measuring.

12 Claims, 11 Drawing Sheets

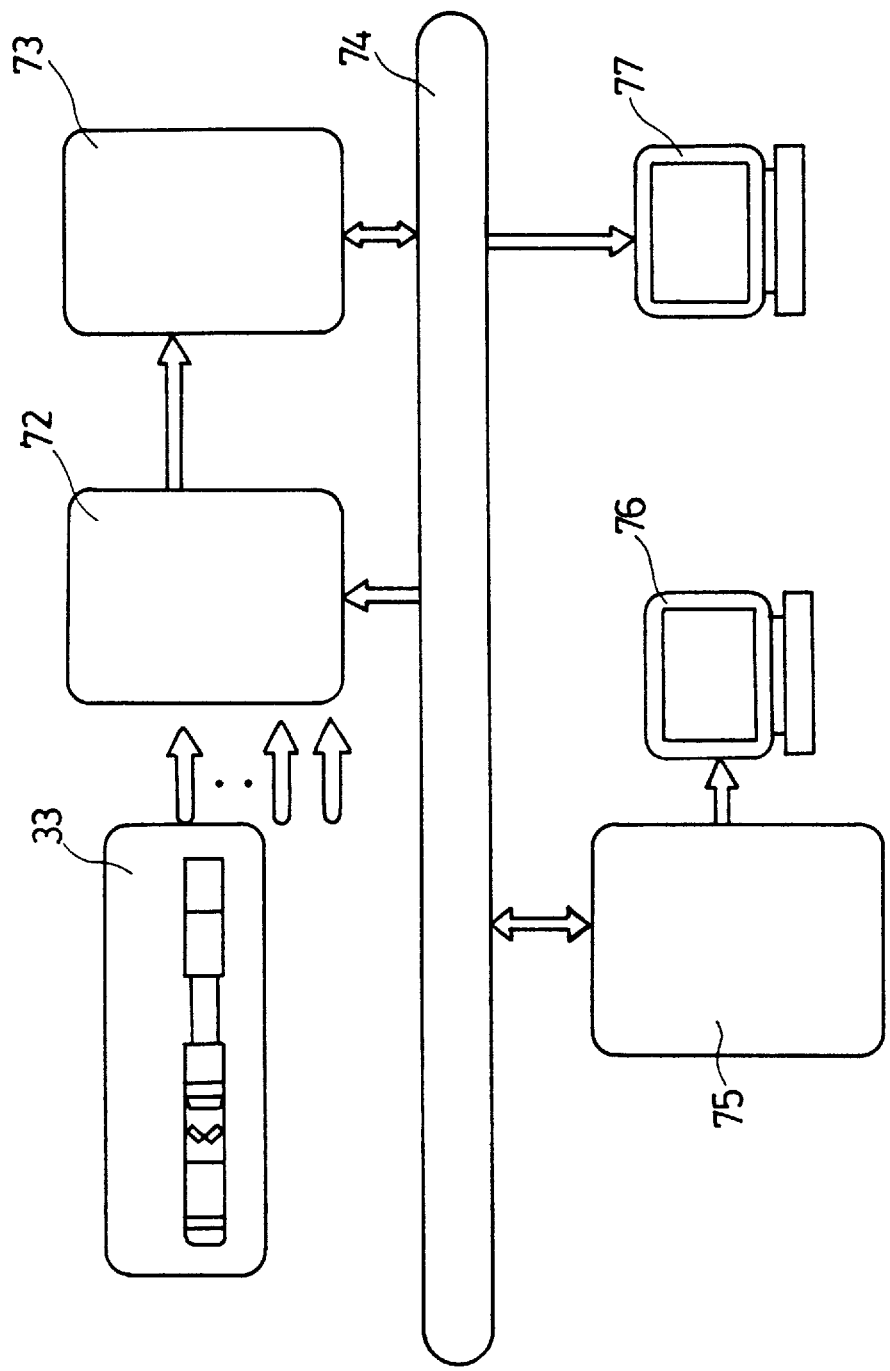

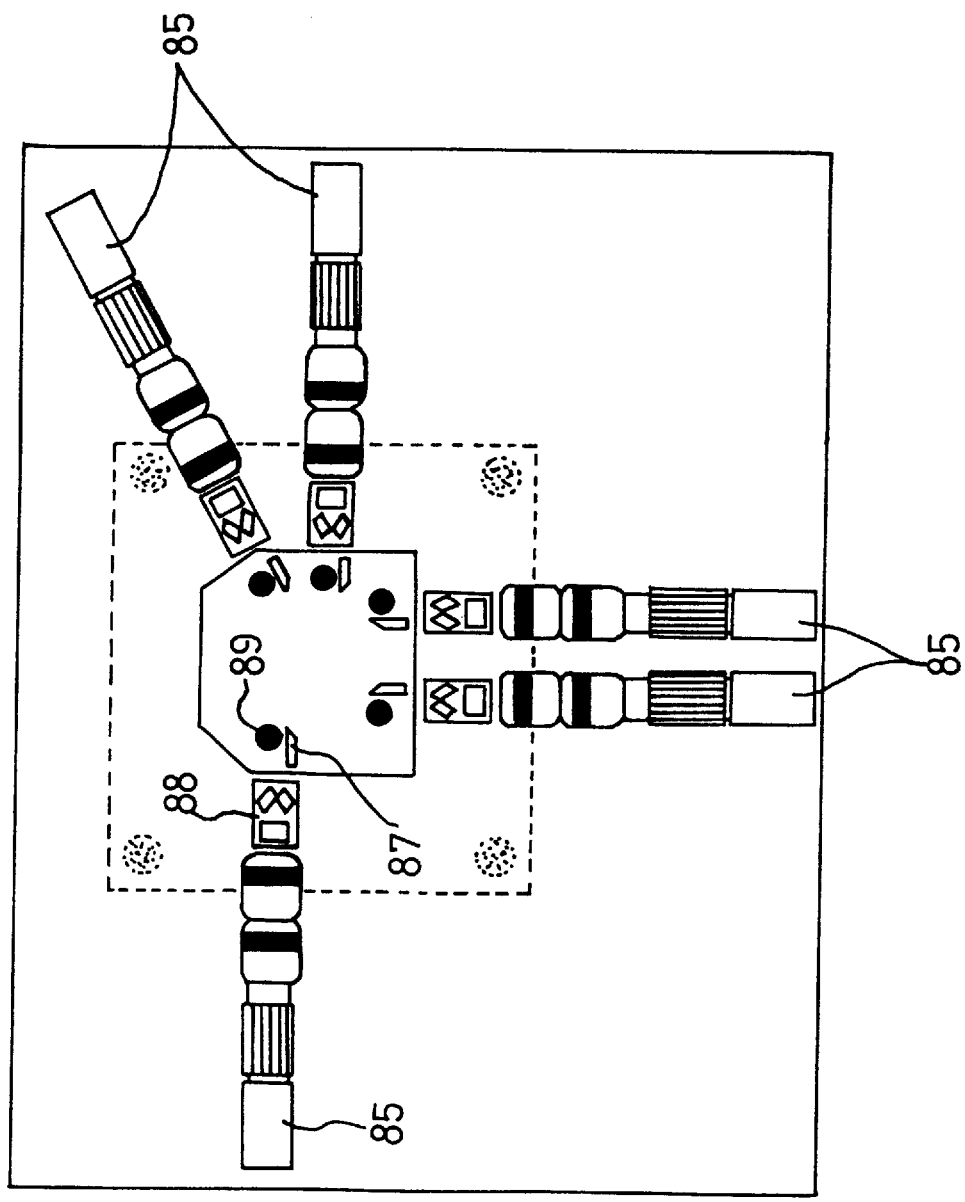

PERPENDICULARITY MEASURING METHOD AND AN APPARATUS THEREOF

BACKGROUND OF THE INVENTION

1. Field of the Invention

The present invention relates to a method and apparatus for measuring perpendicularity of a structure such as posts installed perpendicularly to a reference plane, and more particularly to a perpendicularity measuring apparatus and method of a non-contacting type suitable for precisely measuring the perpendicularity of posts of a tape transport system installed to video tape recorders (VTRs) and camcorders.

2. Description of the Prior Art

Posts of a tape transport system of a VTR or camcorder serve to allow a tape to accurately pass preset positions of a head drum and audio/control heads for the purpose of accurately recording/reproducing a video signal, audio signal and control signal recorded on the tape.

A plurality of posts of tape transport system are installed perpendicularly to a deck base plane corresponding to the position of the heads. A length or an installation angle with respect to the deck base plane of several posts can be adjusted (adjustable posts) after installing them, but almost all posts are fixed posts which are fixedly attached to the deck base by means of a rivet and the like to be unable to be adjusted after the installation. Therefore, the fixed posts have to be precisely installed at the time of installation. Also, in connection with the adjustable posts, if the perpendicularity error of the fixed posts is great, the overall post adjustment has no profit.

FIG. 1A is a plan view of a currently available VTR tape transport system, FIG. 1B is a right-side view showing the VTR tape transport system, and FIG. 1C is a perspective view enlarging the shape of the post of VTR tape transport system. As illustrated in FIG. 1A, the VTR tape transport system 10 is provided with a plurality of posts 12 perpendicularly to a base 11. Posts 11 of an actual product are frequently inclined slightly from a reference position 12' as much as a deviation D. The size and shape of the post differ from the product or function, but, in general, it is 7~25 mm long with a surface roughness of 0.8s grade while having approximately 1.0~2.5 mm diameter in a 8 mm VCR deck. Here, the roughness is so smooth to have an excellent reflectivity with respect to the light.

In order to measure the deviation with respect to the reference position of the post, a method of contacting a measuring probe, using the base plane of the tape transport system as the reference plane, has been heretofore employed.

The conventional contacting-type perpendicularity measuring apparatus is for directly contacting the probe to the upper and lower portions of the post installed to the tape transport system base, so that the perpendicularity is measured. This apparatus is usually utilized for inspecting a general VTR.

The contacting-type measuring apparatus is difficult to be employed for measuring a small-sized post installed to the tape transport system of the small products such as the 8 mm VCR.

Moreover, since the method for directly contacting the probe to the post is applied to thus damage the post surface by the contact pressure, the tape surface is liable to be damaged after completely manufacturing the product. This damage on the post surface probably occurs in general VTRs as well as small-sized products.

Furthermore, in case of the small product, as the deck size itself is small, the diameter of the post is small, too. Accordingly, a minute positional error is incited during probing, which in turn resulting in an error of a measured value. Therefore, the minute error of the probing position causes a problem in embodying the accurate perpendicularity.

SUMMARY OF THE INVENTION

The present invention is devised to solve the general problems caused during performing the contacting type perpendicularity measurement. It is an object of the present invention to provide a non-contacting type apparatus and method capable of measuring perpendicularity without contacting a measuring apparatus, i.e., a probe, to an object of which perpendicularity is intended to be measured.

To achieve the above object of the present invention, there is provided a perpendicularity measuring apparatus which includes, in order to measure the perpendicularity of an object installed perpendicularly to a reference plane, a measuring part for optically obtaining image data of the object to be measured, a measuring-part driving unit for driving said measuring part in the X, Y and Z directions which are perpendicular to one another, and a data processing part for processing and calculate said image data obtained by said measuring part to display the result of the perpendicularity calculation.

Since the perpendicularity measurement of the object having a smooth surface is a premise, the perpendicularity measuring apparatus obtains an image informing the perpendicularity of the objects by the measuring part. Then, the obtained image is converted into a digital signal, in the data processing part, and the digital signal is utilized to calculate the perpendicularity. The calculated perpendicularity may be displayed on an external display unit.

When the image of the object is obtained in the measuring part, two images are obtained in directions perpendicular to each other to secure an inclination in a three-dimensional space. Also, in order to measure the perpendicularity by means of a deviation from a reference position, images of an upper portion and a lower portion of an object are separately obtained, so that a positional deviation of either one, e.g., the lower image using the upper image as the reference position, is taken to calculate the perpendicularity.

Besides, the measuring-part driving unit for three-dimensionally driving the measuring part is provided, and the measuring part is moved to position of the object to be measured first. Thereafter, the measuring part is moved to a place adjacent to the object to obtain the image of the object.

BRIEF DESCRIPTION OF THE DRAWINGS

The above objects and other advantages of the present invention will become more apparent by describing in detail preferred embodiments thereof with reference to the attached drawings in which:

FIG. 6 is a block diagram schematically showing the data processing unit; and

FIGS. 7 and 8 are schematic views showing another embodiment of the perpendicularity measuring apparatus according to the present invention.

DETAILED DESCRIPTION OF THE PREFERRED EMBODIMENTS

One embodiment of the present invention will be described hereinbelow.

Figure 1A:
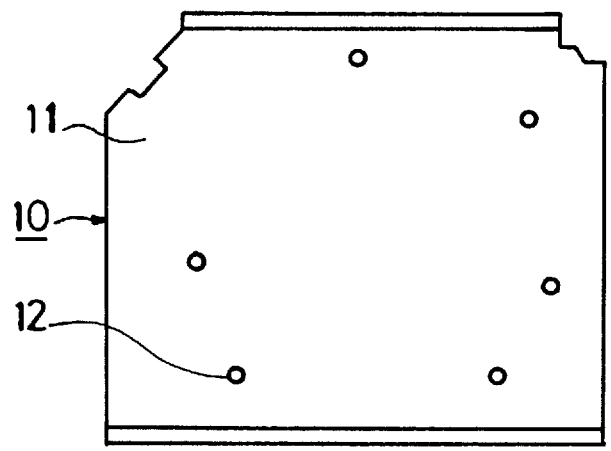
FIGS. 1A to 1C are views for illustrating a VTR tape transport system and posts thereon subjected to be measured.
Figure 1B:
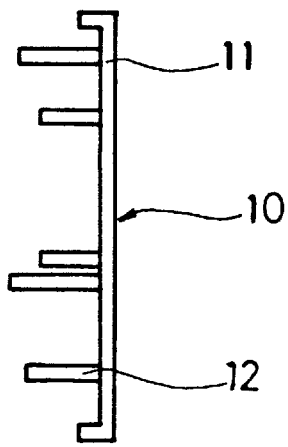
Figure 1C:
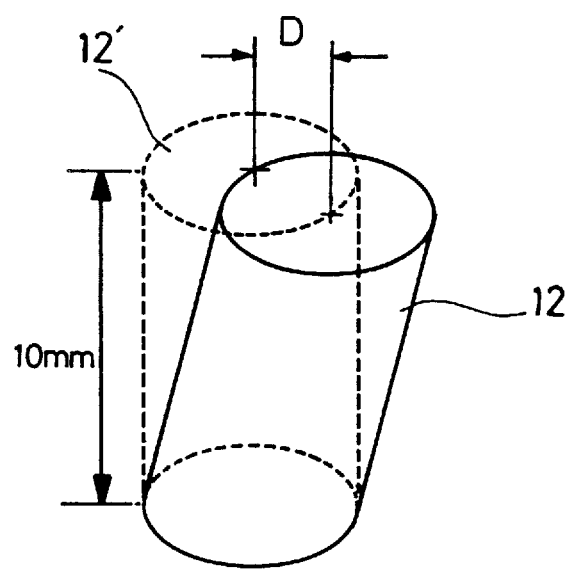
Figure 2A:
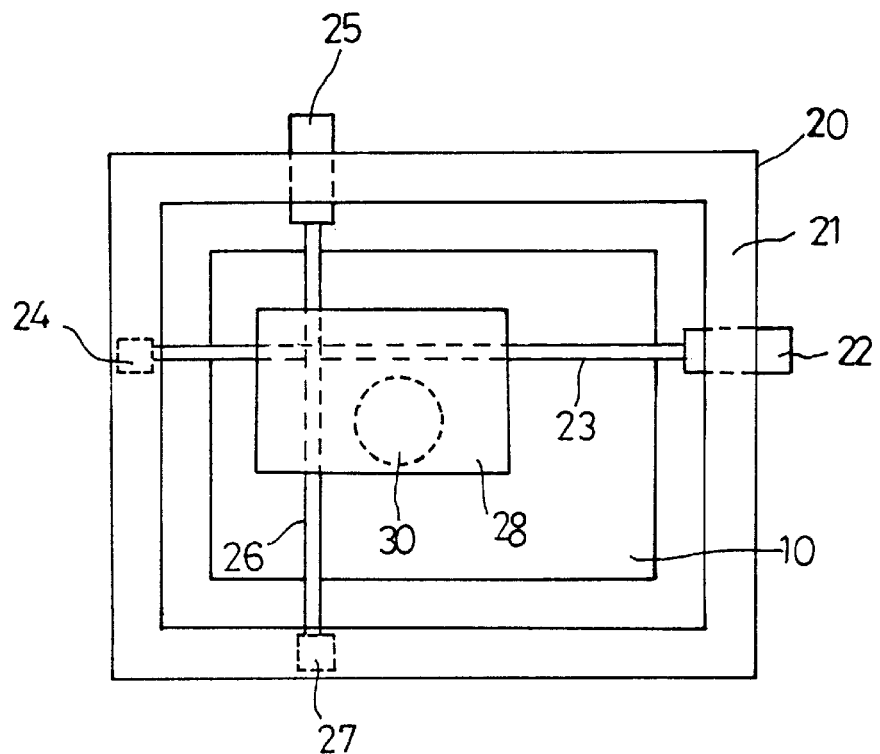
FIG. 2A is a schematic plan view showing a perpendicularity measuring apparatus according to the present invention.
Figure 2B:
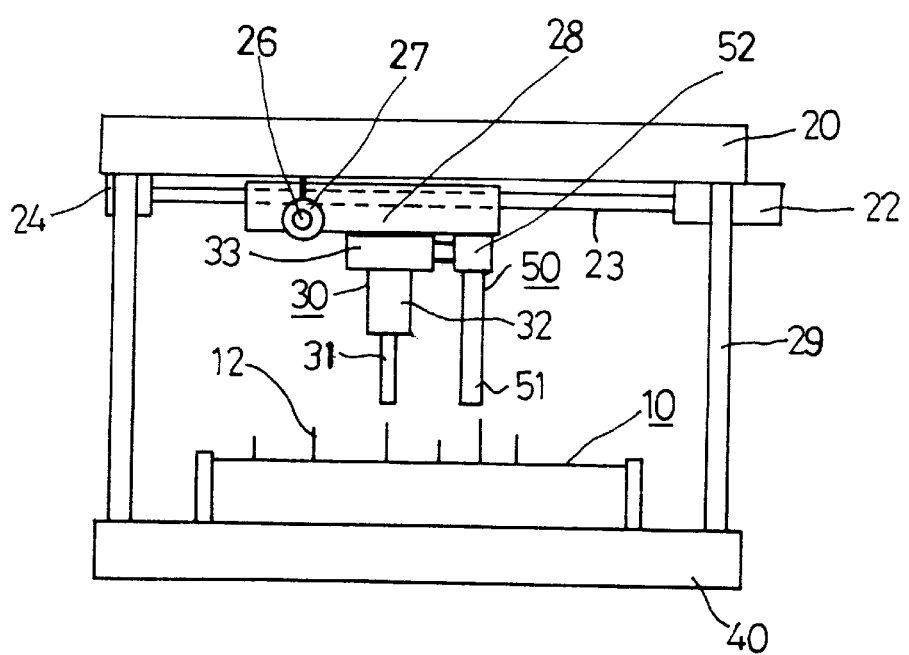
FIG. 2B is a schematic plan view showing the perpendicularity measuring apparatus according to the present invention.

FIG. 2A is a schematic plan view showing a perpendicularity measuring apparatus according to the present invention, and FIG. 2B is a plan view thereof. FIGS. 3A to 3H are views for illustrating a detailed structure of a measuring section in the perpendicularity measuring apparatus according to the present invention.

The perpendicularity measuring apparatus includes the measuring section 30, and measuring-section driving parts 20 and 50.

Measuring section 30 has a probe 31 for acquiring images of two directions perpendicular to each other by inserting a post via an opened lower portion, a lens section 32 connected to the upper portion of probe 31 for enlarging/reducing the image from probe 31, and a CCD camera 33 connected to the upper portion of lens section 32 to convert the image into an electric signal (video signal).

Measuring section 30 is connected to measuring-section driving parts 20 and 50 to be moved in a desired direction, i.e., to be parallel with or perpendicular to a base of tape transport system 10.

For convenience, a plane parallel with the base plane is defined by X and Y axes, and an axis perpendicular to the plane is defined by Z axis.

X-Y axis driving part 20 includes a pair of driving motors 22 and 25 for supplying a driving force which drives measuring section 30 in the X,Y direction, and a pair of axis arms 23 and 26 having one ends connected to driving motors 22 and 25 for performing a rotational movement and outwardly provided with screws on respective surfaces. Additionally, a pair of axis fixing sections 24 and 27 fixes other ends of axis arms 23 and 26, and an X-Y table 21 has a rail (not shown) along the outer edge thereof to which driving motors 22 and 25 and axis fixing sections 24 and 27 are connected for allowing one driving motor and the axis fixing section connected thereto to perform a linear motion by the operation of the other driving motor. Also, a motion plate 28 for mounting Z driving part 50 has screw throughholes for being coupled with axis arms 23 and 26 in the X and Y directions.

Z-axis driving part 50 has a Z-axis guide post 51 fixedly attached to motion plate 28 vertical to the lower portion thereof, an axis coupling 52 for connecting measuring section 30 and Z-axis guide post 51, and a driving source (not shown) between motion plate 28 and measuring section 30 for providing the driving force to enable a linear movement of measuring section 30 along Z-axis guide post 51. At this time, the driving source of Z-axis driving part 50 utilizes an hydraulic driving apparatus or electric motor operated by a pressure of fluid such as air.

Meanwhile, measuring-section driving parts 20 and 50 constructed as above are supported by fixing posts 29 installed to the base 40 of the apparatus.

The method by using the perpendicularity measuring apparatus according to the present invention is performed as below. After X-Y driving part 20 is adjusted to dispose measuring section 30 over a post 12 to be measured, Z-axis driving part 50 is operated to partially insert post 12 into probe 31 of measuring section 30, and an image of a desired post is obtained by probe 31. Then, Z-axis driving part 50 is repeatedly operated to move probe 31 upward, and probe 31 is disposed over post 12 to be measured next. By repeating these operations, the measuring operation is carried out. The image signal of the post may be obtained by separately dividing an upper image and a lower image of the post, or the upper and lower images of the post may be simultaneously obtained.

Figure 3A:
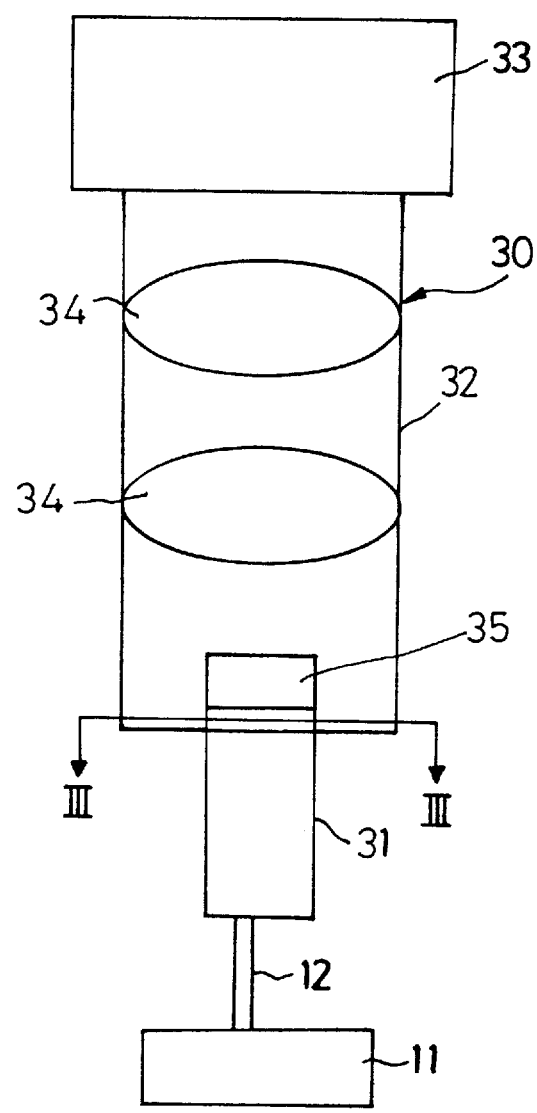
FIGS. 3A to 3H are views for explaining the detailed structure and operation of the measuring section of the perpendicularity measuring apparatus.

As schematically illustrated in FIG. 3A, measuring section 30 has probe 31 for obtaining the image of the post in the two directions perpendicular to each other by inserting post 12 which is to be measured via the opening in the lowermost bottom portion, and lens section 32 joined to the upper portion of probe 31 for enlarging/reducing the image obtained from probe 31. Also, camera 33 joined to the upper portion of lens section 32 picks up the image.

Furthermore, an optical path converting section 35 is installed to the upper portion of probe 31 for converting an optical path to be adjacent to an optical axis of a lens 34. Optical path converting section 35, as shown in FIG. 3D, is formed by adhering two flat glasses 35-1 in the shape of "V." By doing so, the image of post 12 passes through V-shaped glasses 35-1 of optical path converting section 35 to have a post image 12-1 of which middle section is omitted. The reason of producing such an image is in that only the light from both ends of the actual image 12 passes the glass plate, so that the image 12-1 obtained as above displays an effect as if it is reduced in the lengthwise direction.

In this case, the aberration problem is not produced so much to eliminate degradation of an image resolution. Also, since the V-glass plate just changes the position of the light, there is no need to precisely arrange the optical elements thereof.

Figure 3B:
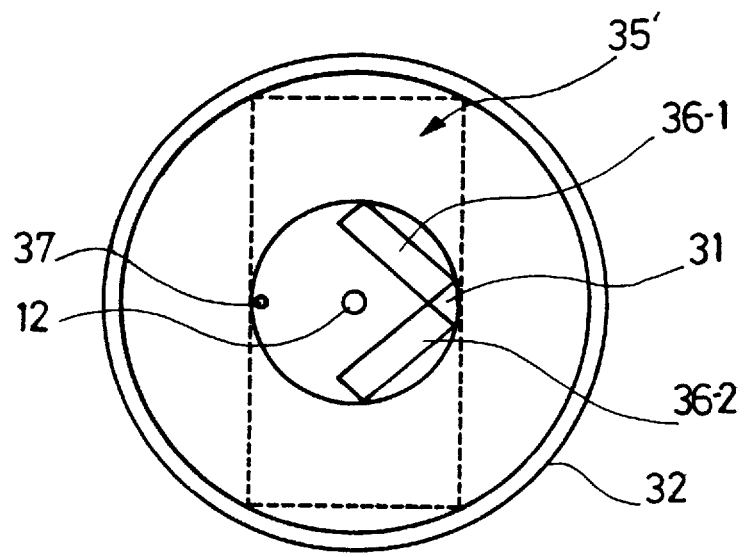
Figure 3C:
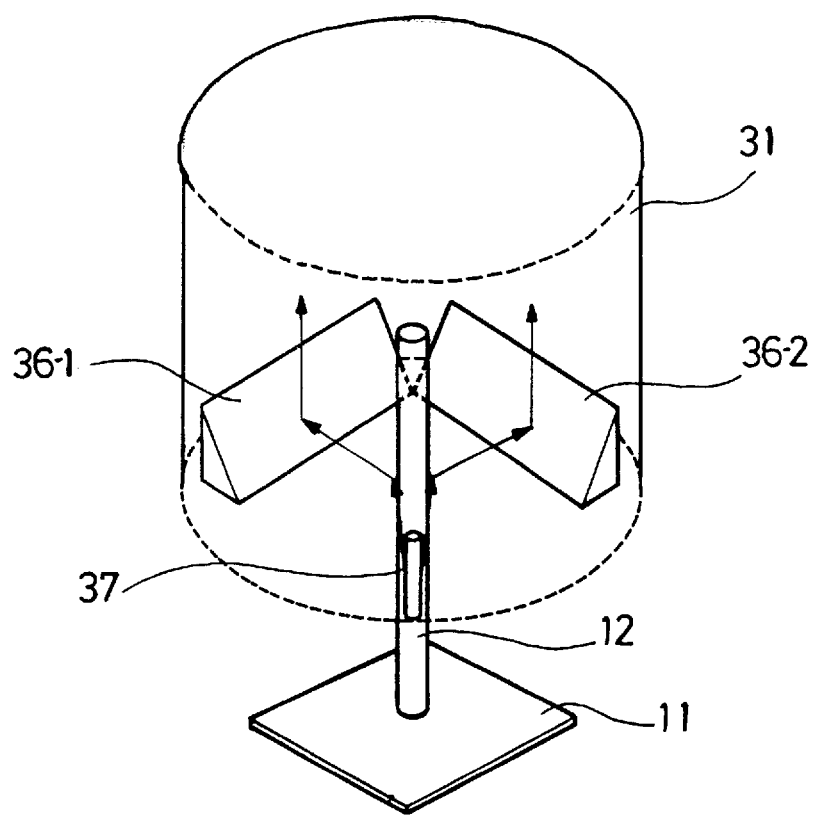
Figure 3D:
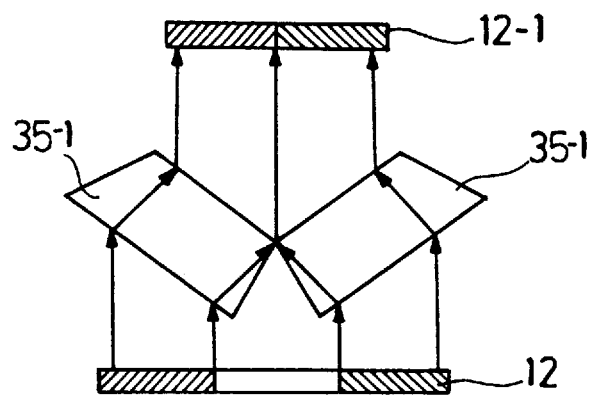
Figure 3E:
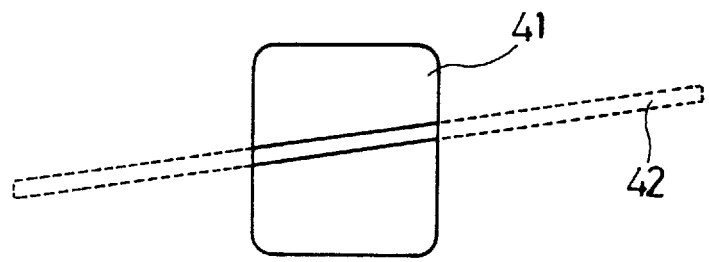
Figure 3F:
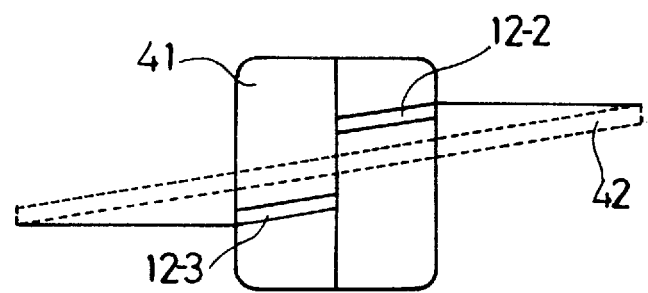

FIGS. 3E and 3F are views for illustrating the image obtained with/without employing optical path converting section 35.

As illustrated in FIG. 3E, if the image is not passed through optical path converting section 35, a portion of measured object 12 or whole image 42 is lengthened on screen 41 to make the measurement of an inclination difficult when the inclination is extremely small.

However, as illustrated in FIG. 3F, when using optical path converting portion 35, the image at the middle portion of measured object 12 is cut away, and images at both ends 12-2 and 12-3 are gathered to the center to be obtained on single screen 41. Therefore, it is easy to observe the deviation even though the deviation is produced by a slight inclination. As described above, there is a significant difference with respect to the same inclination when the image is obtained by passing through optical path converting section 35 to enable the precise measurement.

FIG. 3B is a sectional view taken along line III—III of FIG. 3A, which shows that a casing of probe 31 is joined to the lower side of a casing of lens section 32. A reference numeral 35' is a position of installing optical path converting section 35, and a light source 37 and first and second reflectors 36-1 and 36-2 are installed to one side within the casing of probe 31. Post 12 is inserted between light source 37 and first and second reflectors 36-1 and 36-2.

As shown in FIG. 3C, probe 31 includes light source 37 for irradiating the light upon inserted object 12, and first and second reflectors 36-1 and 36-2 for receiving the image obtained such that the light irradiated from light source 37 is reflected by object 12, and reflecting the incident images toward lens 34 of lens section 32. First and second reflectors 36-1 and 36-2 are installed to form a predetermined angle centering about an extension line which links light source 37 and object 12, thereby respectively receiving the image at the right angle direction. In the drawing, arrows denote individual optical paths. First and second reflectors 36-1 and 36-2 utilize a right-angled prism or a flat glass inclined with respect to the plane parallel with the base by 45°.

By picking up the images incident through probe 31 by means of camera 33, two post images forming an approximately right angle to each other, i.e., X-axis image and Y-axis image, are obtained as shown in FIG. 3D.

Figure 3G:
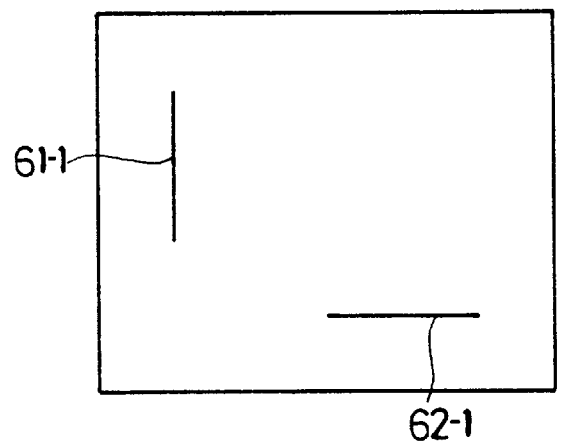
Figure 3H:
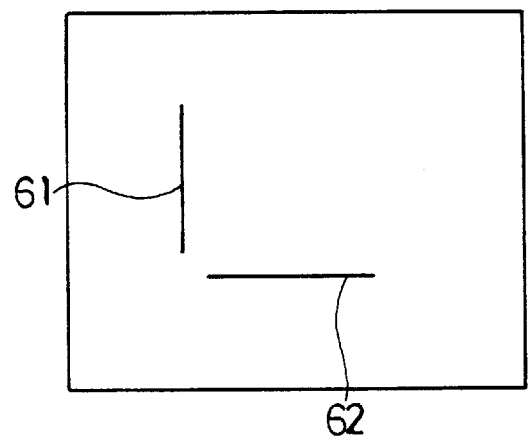

If optical path converting section 35 is not provided, the image obtained at this time is under the state that X-axis image and Y-axis image are remotely separated from each other as shown in FIG. 3G. Thus, the measurement can be carried out even though optical path converting section 35 is not provided, but it is convenient to employ optical path converting section 35 by facilitating the discrimination when the X-axis image is adjacent to the Y-axis image.

On the other hand, it is preferable that the probe is attachably/detachably coupled to the lens section for enabling the use of probes having different sizes in accordance with the shape of the object to be measured.

FIG. 4 illustrates one pattern of the image displayed on an external display apparatus after the image obtained by probe 31 of measuring section 30 is incident to pickup camera 33 via optical path converting section 35 and lens section 32 to be supplied to a data processor, and the result is displayed on the external display apparatus by a data converter.

Figure 4A:
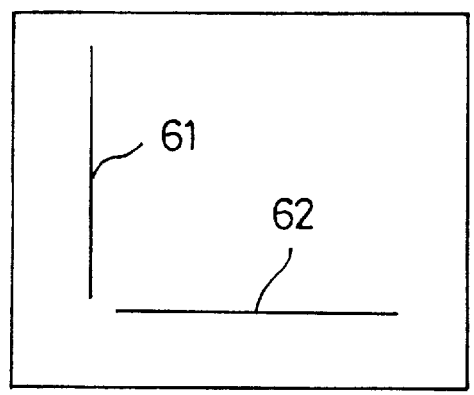
FIGS. 4A and 4B illustrate a displayed images when the upper post portion and the lower post portion are partially picked up by camera.
Figure 4B:
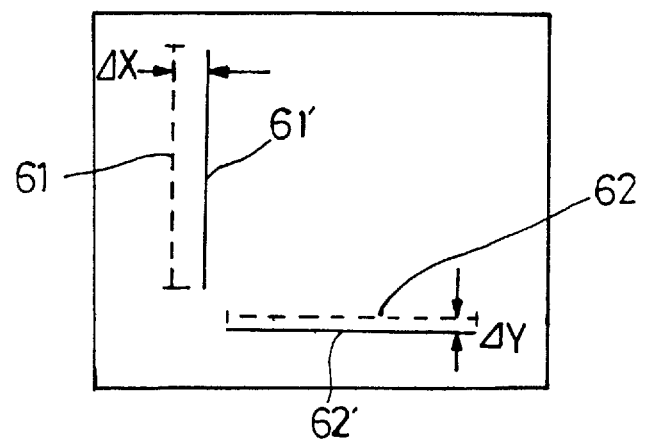

FIGS. 4A and 4B are views for illustrating a case of partially picking up the upper post portion and lower post portion when the image collecting length of probe 31 is shorter than the length of the post.

FIG. 4A shows the screen of taking the upper image of the post, and FIG. 4B is that of taking the lower image of the post, in which only the upper image can be continuously displayed or only the lower image can do so.

In connection with the upper image of the post, image 61 in the X-axis direction and image 62 in the Y-axis direction are displayed on the screen as shown in FIG. 4A. Here, if the post is not perpendicular to the reference plane but is slightly inclined, image 61' in the X-axis direction and image 62' in the Y-axis direction of the lower portion post are displayed on the screen as shown in FIG. 4B, in which an amount of incompletely overlapping the upper X-axis image 62 and lower X-axis image 62' denoted by a dotted line as much as AX becomes a deviation in the X-axis direction, and an amount of incompletely overlapping upper Y-axis image 62 and lower Y-axis image 62' denoted by a dotted line as much as AY becomes a deviation in the Y-axis direction. If the post is perpendicularly installed, the deviation will be approximately zero.

FIG. 5 illustrate another construction of the optical path converting section of FIG. 3.

Figure 5A:
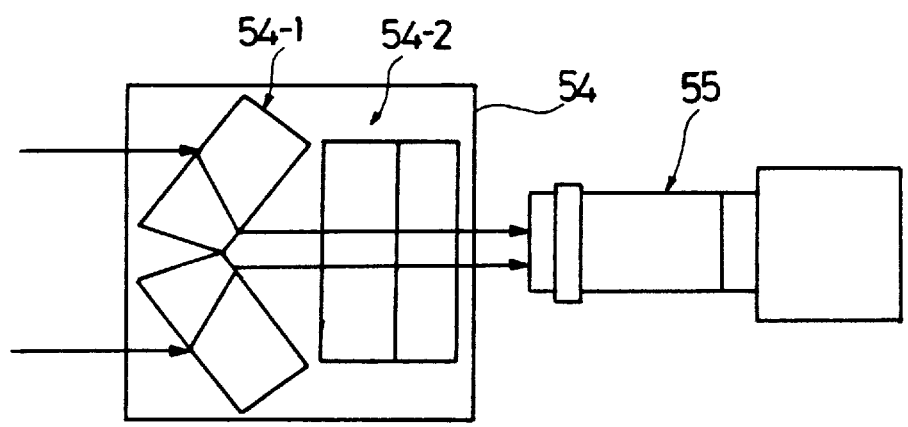
FIGS. 5A and 5B are a plan view and a front view showing another embodiment of the XY-axis optical path converting section.
Figure 5B:
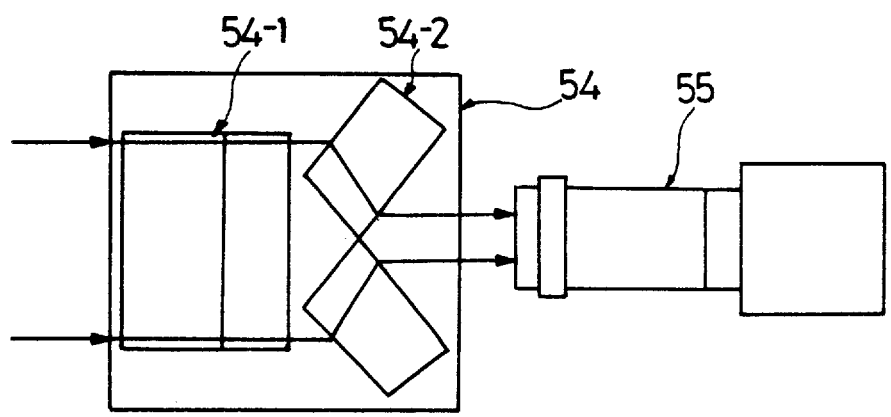
Figure 5C:
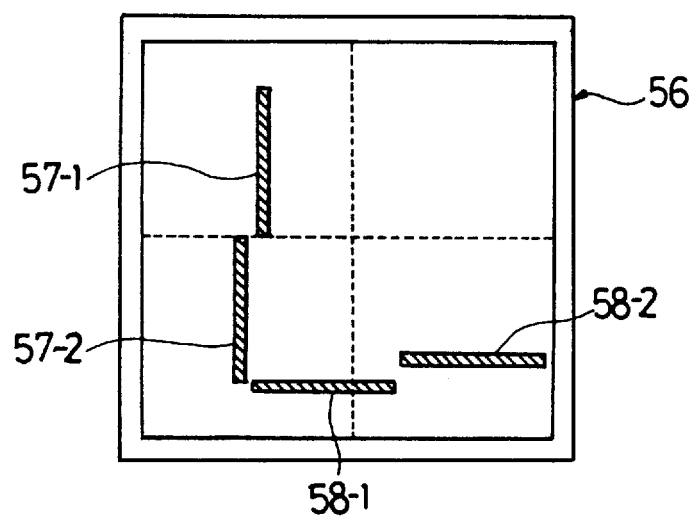
FIG. 5C illustrates an image picked up by the camera after passing through the XY axis optical converting section.

FIGS. 5A and 5B are a plan view and a front view respectively showing an XY-axis optical path converting section 54 installed between the probe and camera for shortening the middle portion of the image passing in both directions of X and Y axes. FIG. 5C shows the image picked up by the camera after passing through XY-axis optical path converting section 54 when the probe can collect the image with respect to the total length.

FIG. 5C illustrates the image under the state that the post is slightly inclined toward the X axis and Y axis with respect to the reference plane. Here, an X-axis image 57-1 at the upper post portion is not connected to an X-axis image 57-2 at the lower post portion by cutting the middle portion thereof, and the middle of an upper image 58-2 and a lower image 58-1 along the Y axis is cut to separate them from each other.

If the post is perfectly perpendicular to the reference plane, the displayed image is not as shown in FIG. 5C, and X-axis image 57-1 at the upper post portion extends together with X-axis image 57-2 at the lower post portion as a straight line. Also, the Y-axis image is not cut in the middle portion thereof to connect upper portion 58-2 and 58-1 to extend as a straight line.

The editing and display of the image picked up by the camera, calculation of the deviation, perpendicularity judgement and the like are executed in the data processor.

FIG. 6 is a block diagram schematically showing the data processor.

First, the image signal obtained by camera 33 of the measuring section is received to a multiplexer card 72 to be converted into digital data in an image grabber 73, and the digital image data is loaded on a data bus 74 to be supplied to and analyzed in a main computer 75. Thus, the result is stored in a memory therein and displayed on a monitor 77. Main computer 75 analyzes and processes the data loaded on data bus 74 to display the result on a system monitor 76.

In addition to the above-stated operation, the main computer functions as a general controller for controlling the driving parts which move the measuring section in the X,Y and Z directions. The general control is carried out by processing a program by the computer.

The program is processed in a menu mode to permit an operator to easily discriminate the result of the measurement, so that the operator can immediately recognize the favorable/poor state of the perpendicularity error of respective posts on the screen.

The operation of the computer in the data processor is for calculating an average of the deviations to obtain an inclination with respect to one direction.

The image processing is performed in such a manner that the upper and lower image signals of the post obtained by a CCD camera are converted into digital signal brightness values between zero and 255 to obtain coordinates (x, y) of the brightest point. A plurality of data obtained as above are processed to obtain the deviation between the upper image signal and lower image signal, and an equation of a straight line and an inclination are obtained via a linear regression method.

If the deviation or inclination obtained as above exceeds a critical error, it is considered as a failure.

On the other hand, the perpendicularity measuring apparatus according to the present invention is described by using the posts of the tape transport system in the VTR as objects, which also can be employed for measuring any object satisfying a smooth surface by 0.8s with a reflectivity and perpendicular to a reference plane.

Different from the conventional contacting type measuring method, the perpendicularity measuring method of non-contacting type and the apparatus utilizing the method according to the present invention adopt an optical principle to execute the measurement without actually contacting the measured object, thereby solving the problem of causing an error due to the direct contact. Moreover, it is enough to be applied to the measurement of an object with a small measuring space. Because the measuring section can be freely moved with respect to the X, Y and Z directions to execute the measurement, even a different object requires no separate setting to thus facilitate the measuring.

Figure 7:
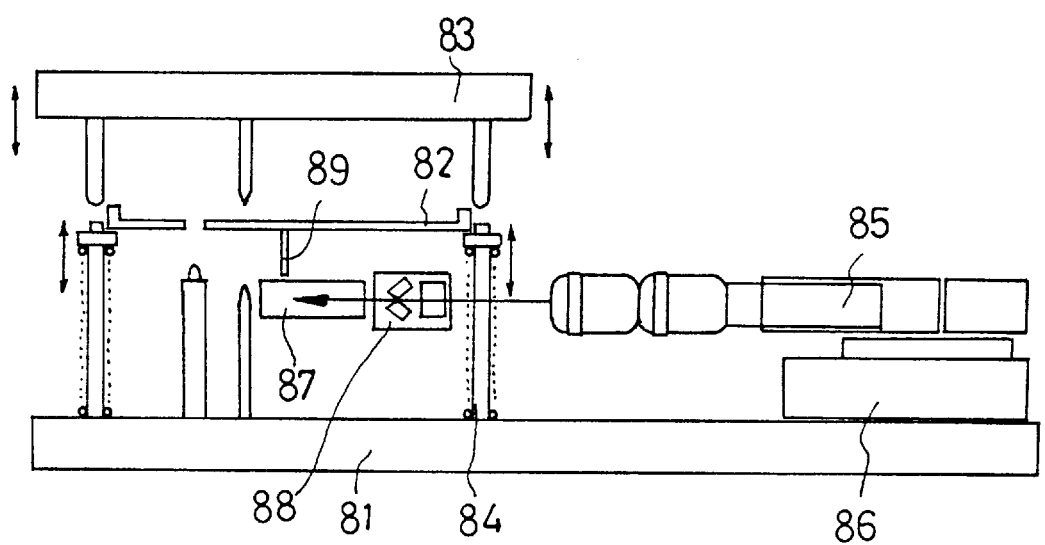

FIGS. 7 and 8 are schematic views showing another embodiment of the perpendicularity measuring apparatus according to the present invention, in which FIG. 7 is a front view and FIG. 8 is a plan view. Here, the perpendicularity measuring apparatus according to the present invention will be separated into a mechanism part and a data processing part.

The data processing part is as described with reference to FIG. 6, and the mechanism part includes apparatuses 83 and 84 for feeding a deck 82 by an operator, and a base plate 81 for precisely fixing a relative position of a post 89 and optical systems 87 and 88 of deck 82 within 0.05 mm.

The apparatuses for feeding deck 82 are formed of a pneumatic cylinder 83 and a guide post 84. A camera 85 is seated on base plate 81 via an adaptor 86.

In the optical system, a probe 87 for collecting an image of post 89 in the vertical direction and an optical path converting section 88 for cutting out the middle portion of the collected image while passing through upper and lower images of post 89 are horizontally coupled to video camera 85 which is precisely fixed to have the relative position with post 89 within 0.05 mm by an adaptor, i.e., camera driving unit, 86.

The data processing procedure of the foregoing perpendicularity measuring apparatus having the mechanism part is carried out as described above.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A perpendicularity measuring apparatus for measuring perpendicularity of an object installed to a reference plane, comprising:

a measuring part for optically obtaining image data of the object to be measured, the image data being obtained from a front viewing plane to the object and a side viewing plane to the object, wherein the front and side viewing planes are perpendicular to the reference plane and to one another;

measuring-part driving means for moving said measuring part towards and away from the object; and a data processing part for processing said image data obtained by said measuring part to calculate said perpendicularity, and outputting the result of the calculation.

2. A perpendicularity measuring apparatus as claimed in claim 1, wherein said measuring part comprises:

a probe for collecting the object image in two directions perpendicular to each other by inserting said object to be measured into an opening in a lower portion thereof; and a camera connected to an upper portion of said probe for picking up said object image as an electric image signal.

3. A perpendicularity measuring apparatus as claimed in claim 2, wherein said probe comprises:

a light source part for irradiating light upon said inserted object; and first and second reflecting parts for receiving images obtained by reflecting said light from said light source part by said object in the vertical direction to each other, and supplying said received images to said camera.

4. A perpendicularity measuring apparatus as claimed in claim 3, further comprising an optical path converting part formed to upper portions of said first and second reflecting parts between said probe and camera for converting optical paths of said two images reflected by said first and second reflecting parts to be adjacent to an optical axis of a lens.

5. A perpendicularity measuring apparatus as claimed in claim 4, wherein said optical path converting part is a V-shaped glass formed by adhering two flat glasses in the shape of "V."

6. A perpendicularity measuring apparatus as claimed in claim 2, wherein said measuring-part driving means comprises:

a motion plate attached with said measuring part having through-holes for holding screws in the X-axis and Y-axis directions;

an X-Y axis driving part having an X-Y table for driving said motion plate in the X and Y directions parallel with said reference plane of said object; and a Z-axis driving part coupled to said motion plate for driving said measuring part in the Z direction perpendicular to said reference plane of said object.

7. A perpendicularity measuring apparatus as claimed in claim 6, wherein said X-Y axis driving part comprises:

an X-axis driving section including an X-axis driving motor for providing a driving force to drive said motion plate in said X-axis direction, an X-axis arm unit coupled to an axis of said X-axis driving motor for performing a rotational movement and having a screw thereon to be screw-coupled into said through-hole in said X-axis direction of said motion plate, and an axis fixing unit for fixing one end of said X-axis arm unit, said X-axis driving section fixed with said driving motor and X-axis fixing unit being capable of performing a linear movement in said X-axis direction by an operation of said X-axis driving motor, and a Y-axis driving section including a Y-axis driving motor for providing a driving force to drive said motion plate in said Y-axis direction, a Y-axis arm unit coupled to an axis of said Y-axis driving motor for performing a rotational movement and having a screw thereon to be screw-coupled into said through-hole in said Y-axis direction of said motion plate, and an axis fixing unit for fixing one end of said Y-axis arm unit, said Y-axis driving section fixed with said driving motor and Y-axis fixing unit being capable of performing a linear movement in said Y-axis direction by an operation of said Y-axis driving motor.

8. A perpendicularity measuring apparatus as claimed in claim 6, wherein said Z-axis driving part comprises:

a Z-axis guide post vertically fixed to said motion plate;

an axis coupling part for coupling said measuring part to Z-axis guide post; and a driving source installed between said motion plate and measuring section for supplying the driving force to allow said measuring section to be linearly moved along said Z-axis guide post via said axis coupling part.

9. A perpendicularity measuring apparatus as claimed in claim 8, wherein said driving source is a motor.

10. A perpendicularity measuring apparatus as claimed in claim 8, wherein said driving source is a hydraulic driving apparatus operated by a pressure of a fluid such as air.

11. A perpendicularity measuring method of a non-contacting type for measuring perpendicularity of a straight post installed perpendicularly to a reference plane comprising the steps of:

picking up partial images of an upper end and a lower end of said post in two directions perpendicular to each other, and combining obtained images into one image;

calculating inclinations or deviations of four images of lower end portion and upper end portion in said combined image; and comparing said inclinations or deviations to measure said perpendicularity with respect to said reference plane.

12. A perpendicularity measuring apparatus for measuring perpendicularity of an object installed perpendicularly to a reference plane comprising:

a measuring part for optically obtaining image data of the object to be measured, said measuring part including a probe for collecting the object image in two directions perpendicular to each other by inserting said object to be measured into an opening in a lower portion thereof, and a camera connected to an upper portion of said probe for picking up said object image as an electric image signal;

measuring-part driving means for driving said measuring part in the X, Y and Z directions which are perpendicular to one another; and a data processing part for processing said image data obtained by said measuring part to calculate said perpendicularity, and displaying the result of the calculation.

* * * * *